Dec. 17, 1940.  V. J. LOWE ET AL  2,225,387
PRODUCTION OF COOKED ACID CASEIN
Filed July 13, 1938  3 Sheets-Sheet 3
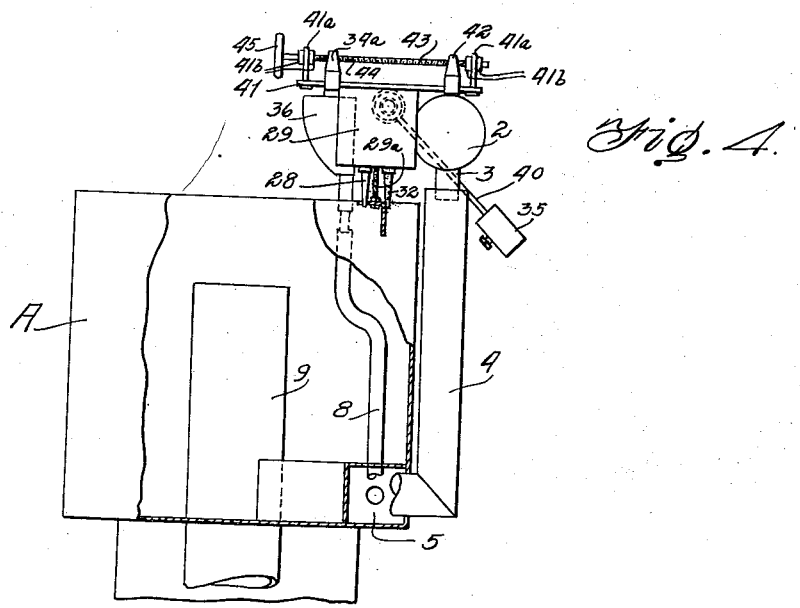
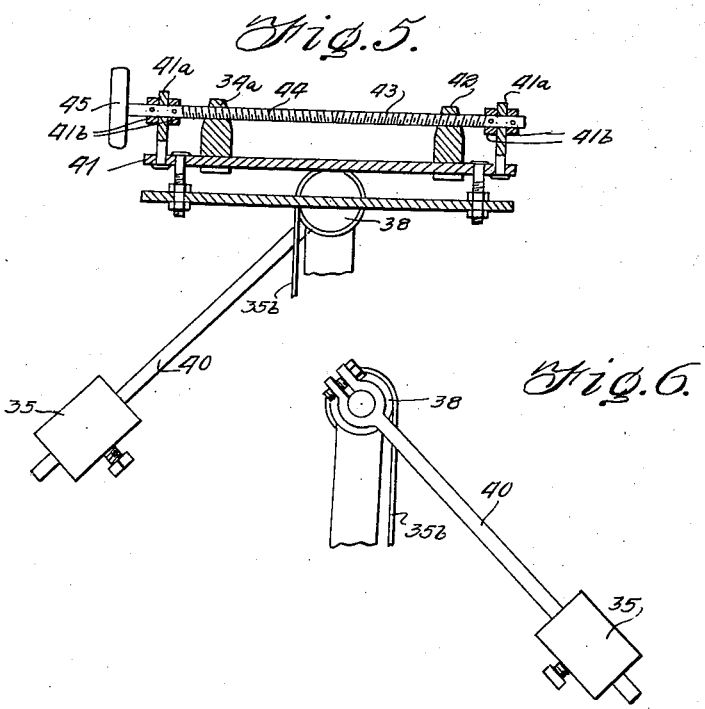

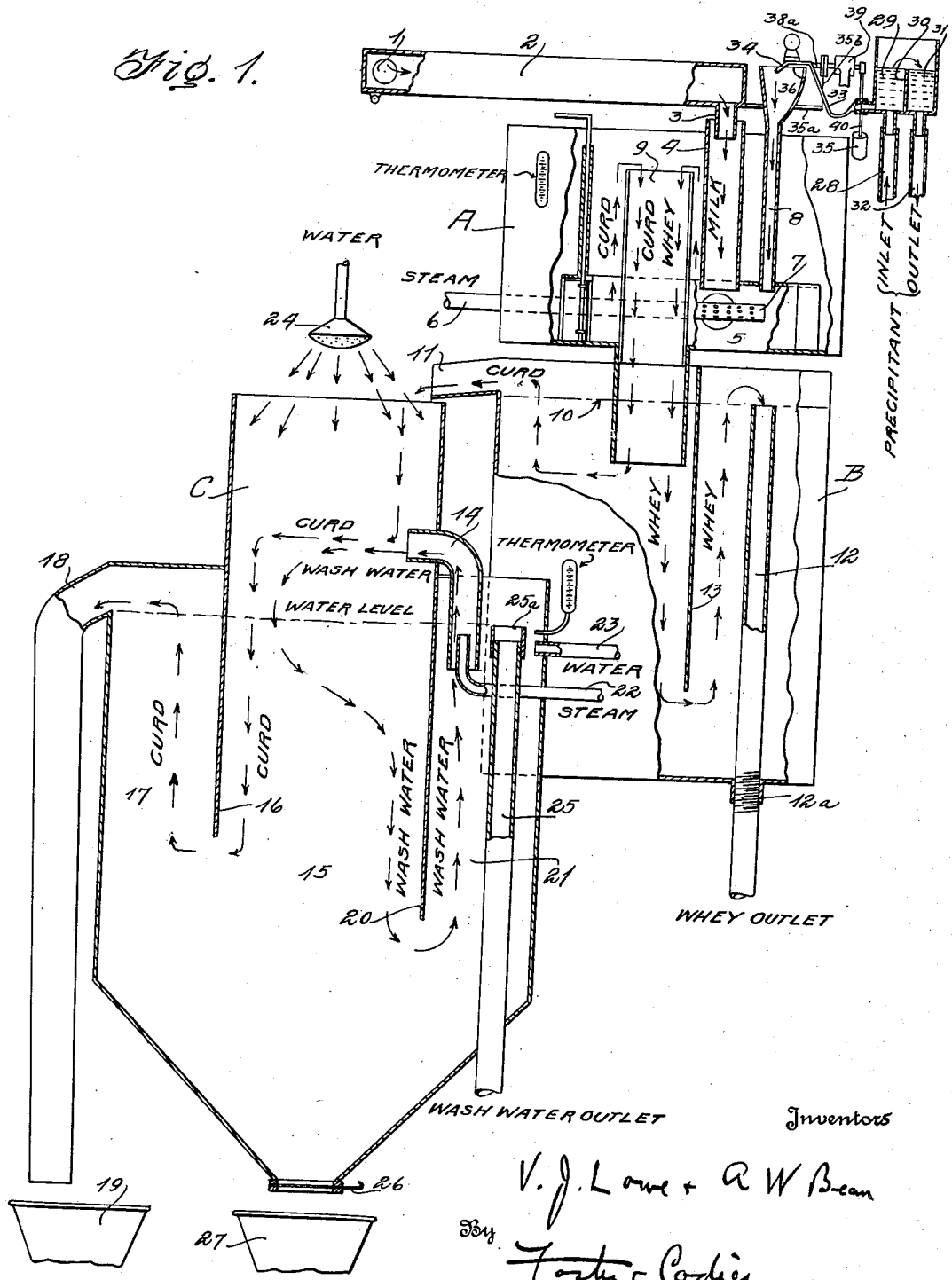

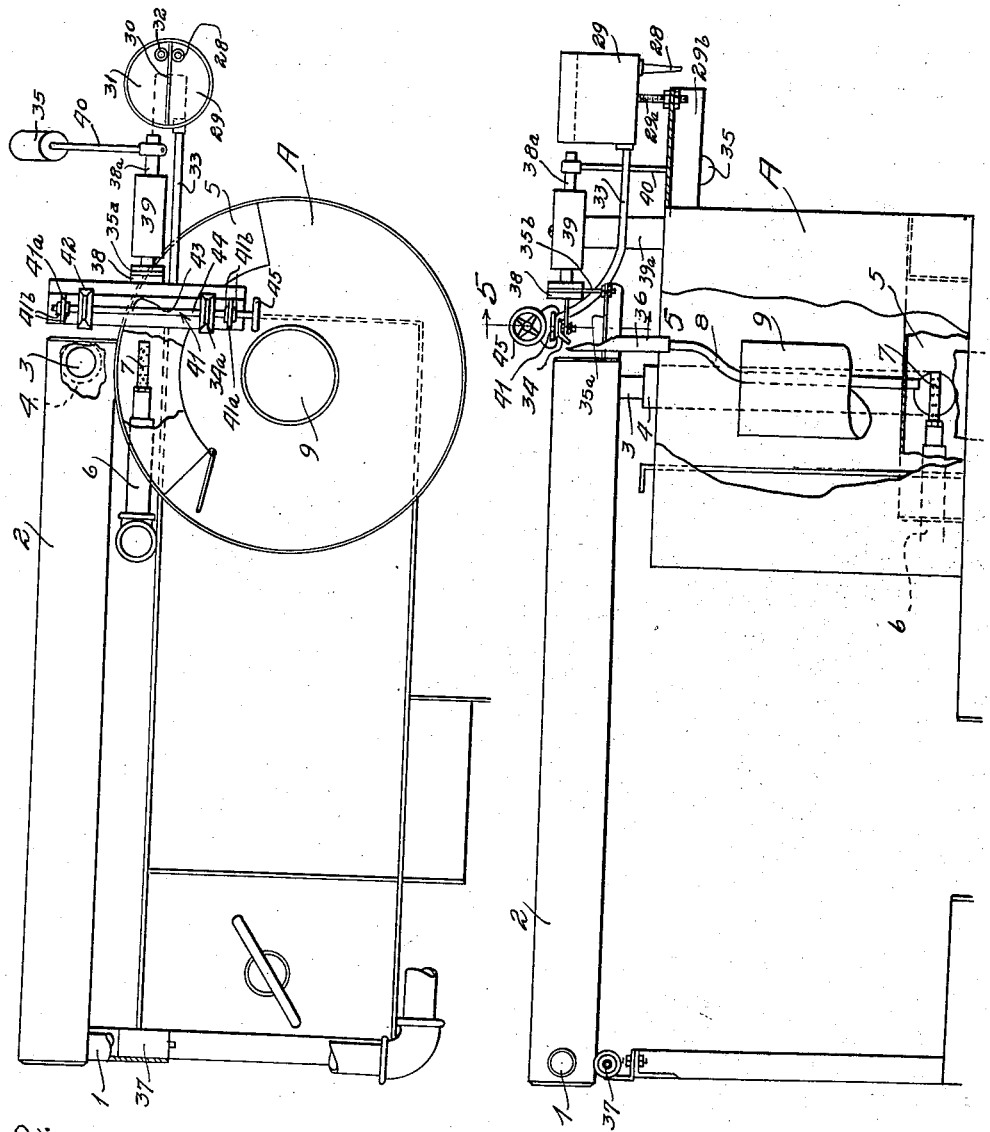

Patented Dec. 17, 1940

2,225,387

UNITED STATES PATENT OFFICE 2,225,387

PRODUCTION OF COOKED ACID CASEIN

Vernon J. Lowe and Arthur W. Bean,
Marengo, Ill.

Application July 13, 1938, Serial No. 219,105

8 Claims. (Cl. 260—120)

This patent application relates to improvements in the art of making certain types of casein from milk. It is well known that casein may be prepared from skim milk by a variety of methods. For example the casein may be precipitated from the milk with the aid of rennet (the product being called "rennet casein" in the industry) or by the addition of various organic or inorganic acids to cause coagulation of the casein in the milk. (This product is called "acid casein" or "acid precipitated casein," or "hydrochloric acid casein" or "mineral acid precipitated casein" etc.) Another method consists in allowing the skim milk to develop enough lactic acid by natural souring (sometimes after adding a small amount of sour milk) to cause precipitation of the casein. (This latter casein is generally referred to as "naturally soured casein" or "self soured casein." A modification of the naturally soured type is also practiced which consists in adding a starter which is a lactic ferment, to the milk in order to hasten the development of lactic acid, and hence hasten the precipitation. Another process consists in adding relatively high acidity whey obtained from the coagulation of milk, using sufficient of this whey to precipitate the casein. (This also produces "acid casein.")

Notwithstanding various statements in patents and literature to the effect that a naturally soured or lactic casein has stronger binding qualities or better working qualities than casein made with mineral acids, we have demonstrated by various tests and by observing the working qualities of various types of casein in mill practice, that this is not a correct conclusion and that casein made with the aid of mineral acids when prepared under proper methods of manufacture, is equal in strength and sometimes actually stronger than lactic casein. Furthermore, lactic casein or self soured casein has a much greater tendency to develop a peculiar cheesy-type odor when the dry casein is kept in storage over a long period of time. It has also been frequently noticed that a lactic or self-soured casein when dissolved and used in the preparation of paper coating and in the making of casein paints, that the resulting dried coating or paint film has considerably more tendency to give off an undesirable cheesy odor than is the case with a properly made mineral acid precipitated casein.

In manufacturing casein with the use of mineral acid there are two processes or methods used, the one method known to the trade as the "pressed casein method" and the other known as the "cooked method." The "pressed casein method" is performed (usually in a creamery) substantially as follows:

Skim milk is placed in a vat and heated to about 120° F. Thereafter diluted mineral acid, usually hydrochloric or sulphuric, is slowly added to the milk in the approximate proportion of 1 pint (about 1 lb. 9 oz.) of the commercial sulphuric acid of 66° Bé. (which first has been diluted with about 5 quarts or more of cold water) for each 1000 lbs. of skim milk. Or, about 3 lbs. 12 ounces of commercial concentrated hydrochloric acid could be similarly used. The amounts of acid are varied somewhat, depending on the degree of sourness in the milk used. The acid may be simply dumped in (e. g. added from a bucket) or it may be allowed to run slowly into the milk from a container or it may be sprayed onto the milk, but in any case it is important that the milk be kept well agitated while adding the acid. In small creameries this is usually done by stirring the milk with a paddle by hand but in some cases the agitation is effected by a power operated mechanical agitator. After the acid has been added, stirring is continued for a few minutes until the casein is thoroughly precipitated from the whey. The agitation is then discontinued, the casein is allowed to settle to the bottom of the tank or vat and thereafter the whey is drained off. After the whey has been separated, cold or slightly warm water (e. g. at 70° to 105° F.) is run into the tank or vat containing the precipitated casein, in sufficient quantity to well cover the mass of casein resting in the bottom of the vat and the soft casein in relatively fine particles, is thoroughly agitated with this water by any convenient means in order to wash the whey and free acid, etc. from the casein as completely as commercially possible. Again the casein is allowed to settle, the wash water removed and the casein placed in any convenient type of press with the aid of press-cloths to hold the casein in the press. Pressure is applied and the casein is allowed to remain in the press for a number of hours in order to remove the excess liquid from the casein. Such a casein properly pressed, will usually contain about 60% of water. After the pressing operation the casein is broken apart into small pieces, usually smaller than ¼ inch and spread on wire trays for drying in a drying tunnel or it may be dried by any other desirable means such as a continuous drier, a rotary drier or the like. After the casein is dried it may be stored for a long period of time without liability to injury.

When casein is made by the cooking method, the procedure may be exactly the same as followed in the pressed casein method above described, up to the point of washing the precipitated casein with water, but in making cooked casein after the wash water has been added, direct steam is run into the wash water until a relatively high temperature is reached, about 180 or 190° F. being preferred. The casein is gently stirred more or less during this heating process which causes the relatively fine particles of casein to coalesce and join together in a solid, tough, rubbery mass. After this heating period the wash water is drawn off and the cooked casein, while in the hot condition, is generally cut into sections, which permits one to handle relatively large chunks of the hot, plastic mass with a shovel. While the casein is in this hot condition and after having been cut into sizable pieces, it is placed in any desired containers (e. g. metal barrels) and because of its plastic condition while hot, the chunks join together to form a mass that becomes solid, uniform and tough, upon cooling. The moisture content of such cooked casein is generally about 60%, although it usually has not undergone a pressing operation.

The advantage of making the cooked type of casein is of great importance for small creameries who do not produce sufficient casein to warrant the expense of casein drying equipment since the cooked type of casein will permit of transportation to a central drying plant without danger of putrefaction. Such casein will keep several weeks even in warm weather, whereas pressed casein as usually made will become putrid and spoil during warm summer weather within two or three days after making and up to the present it usually has been commercially impossible to produce pressed casein and ship it any considerable distance to a central drying plant.

From the foregoing description of the prior art, it is obvious that the advantage of cooked casein is of primary importance. However, we have observed after many years of experience in this field, that there is a great variation in the quality of cooked casein as prepared in actual creamery practice. One of the principal difficulties in making cooked casein at present lies in th fact that during the washing period either insufficient water is used or the wash water is not heated to a high enough temperature to properly cook the casein, with a result that the casein produced will not keep sufficiently long enough for transportation to central drying plants, and furthermore, because of the imperfect heating of the wash water the casein lacks uniformity in viscosity of the casein solution when subsequently prepared for industrial application. It is well known that small creameries employing the very minimum of labor are very apt to use insufficient care in preparing this cooked casein and that the cooking treatment is not long enough to attain 180° F. or thereabouts in the wash water or that the casein is not thoroughly agitated in the hot water and that very often sufficient wash water has not been run onto the casein in the first place to properly cover the mass of casein and supply sufficient water for proper washing.

We have noticed a serious disadvantage in the heretofore commonly used method of making cooked casein because of the wide variations in the physical properties in the resulting casein when dried, ground and dissolved with solvents, this variation being a decided difference in the viscosity of the resulting casein solution. For example we have found that a particular small creamery making cooked casein from approximately 10,000 to 15,000 lbs. of milk per day and by following the usual method for making cooked casein as described above, has produced during a 15 day test period, casein varying in viscosity between 16 and 60 (Stormer). A standard method for preparing the casein solution and determining these viscosities are as follows:

80 grams of the dry casein is ground so that it all passes through a 24 mesh sieve, it is mixed with 20 grams of borax and 400 ccs. of cold water. The mixture is stirred and heated to 160° F. The heat is then discontinued but stirring is continued for 15 or 20 minutes or until the casein is completely dissolved. The resulting solution is then cooled to 140° F. and the viscosity is determined by a standard method, e. g. in a Stormer viscosimeter operated by a 500 gram weight. The results of the viscosity tests under the above conditions with various samples of casein from the creamery referred to above, showed (during the 15 day period mentioned) a wide variation (e. g. from 16 R. P. M. to 60 R. P. M. Stormer reading). It is therefore apparent that the user of such a casein may very likely obtain non-uniform results due to this variation in viscosity because there will be a non-uniformity of the consistency of the solution from one batch to another, even when the same amount of water, same temperature and the same method of preparation of the solution, are used. This leads to serious difficulty in plant operation for the user of such a type of casein.

By our new method of making cooked casein we are able to produce a very uniform cooked acid casein, both as to solubility and viscosity and we are able to accomplish these results in a continuous process. We give herewith our preferred method for accomplishing these results, although we do not wish to be limited to this exact procedure so far as mechanical arrangements and the like are concerned but wish to claim broadly the manufacture of cooked casein by a continuous mechanical process substantially as described.

Reference is made to the drawings attached hereto. In said drawings, Fig. 1 shows a vertical section (partly in elevation) of the entire apparatus. Fig. 2 is a top plan view (partly in section), Fig. 3 is an elevation (partly in section) and Fig. 4 is an elevation, at right angles to Fig. 3, (parts being shown broken away, for clearness of illustration.) Fig. 5 is the large detailed section on the line 5—5 of Fig. 3. Fig. 6 is a fragmentary detail of a counter-balance arrangement used herewith. The apparatus will be seen to consist in large part, of three tanks or compartments, A, B and C, with associated parts.

In the operation of the process skim milk coming from a holding tank or directly from a cream separator, enters by tube 1 and flows through milk scale chamber 2, and from the chamber to the outlet tube 3 which delivers the milk to the curdler inlet tube 4. From tube 4 the milk runs to the curdler heating and precipitating mixing chamber 5 located in compartment A. In mixing chamber 5 of compartment A steam is injected into the milk through pipe 6 and steam nozzle 7 in sufficient quantity to heat up the milk to the desired temperature for curdling, usually about 100 to 120° F. This is far below cooking temperature. Immediately after the milk passes steam nozzle 7 it comes in contact with the precipitating medium, say hydrochloric or sulphuric acid, entering through tube 8 in sufficient quantity to cause immediate coagulation of the milk in a non-granular form of soft precipitated casein. The amount of the acid can be that commonly used, or very slightly less. The precipitated casein immediately separates from the whey and collects into a homogeneous mass, separating from the whey and rising to the top of the whey and as the operation continues, overflows with the whey down through tube 9 and into the whey separating compartment B. As the casein leaves tube 9 it immediately rises above the top of the whey level 10, and leaves compartment B through outlet 11 with only a very little of the whey. The whey in compartment B establishes a level as shown by broken line 10, which is adjusted slightly below the curd outlet 11. The whey level is determined by the vertical adjustment of the whey overflow tube 12, by the screw threads 12a. The baffle plate 13, prevents floating casein from reaching overflow tube 12, thereby effecting a substantially complete separation of casein from the whey, the whey being removed from compartment B through tube 12. The casein from which the whey has been largely removed, falls from spout 11 into the cooking and washing compartment C. Here the casein falls through a high velocity stream of hot water which enters compartment C through tube 14. We have found that the resulting casein is satisfactory when we use approximately 170 lbs. of this hot water for 1000 lbs. of milk used in preparing the casein. In referring to "hot water of high velocity" we have found this preferable and we usually have the hot water driven by a force equivalent to a pressure of about 10–20 lbs. per sq. inch and at a temperature above 150° F., up to 180° F. A temperature of 165° F. is satisfactory. By this washing method we are able to remove substantially the greater portion of the remaining whey, free acidity and other impurities from the casein, which may have passed over from the whey separating compartment B through spout 11. While the casein is undergoing this hot water treatment it is first more or less broken up into relatively small pieces due to this washing operation and as the hot water passes through tube 14 into central portion of compartment C. The curd then immediately starts to again collect together in the condition of a rather firm mass due to the cooking action caused by the heating of the casein during the washing with this hot water. As the casein gradually collects into this homogeneous plastic mass due to the cooking action, it remains in a floating condition, that is floating on top of the wash water, until more of the casein entering C at 11, forces it down through chamber 15 and under the baffle plate 16, where the casein again rises into chamber 17 and leaves the washing compartment C, through spout 18, at just above the water level, and thereafter the casein gradually flows in a plastic mass from spout 18 into a shipping container 19. The casein is then finished, already packed in a container, preferably a metal container and is ready to ship to a central drying plant.

In the meantime the wash water is circulated down through chamber 15 and under baffle plate 20, up through chamber 21 and some of this may again enter chamber 15, due to the suction and force of the steam jet entering tube or pipe 14 from the steam supply pipe 22. Additional water is added as desired (preferably continuously), through pipe 23 into compartment C and if desired, a small amount of water is also allowed to sprinkle onto the top of the casein in compartment C in order to arrest foam. This supplemental water supply is represented by nozzle 24. The amount and temperature of the hot wash water flowing into compartment C through pipe 14 should be sufficient to regulate the temperature of the wash water in tank 15, to above 150°, but not over 180° F. (best about 165° F.), during the continuous process of washing and cooking the casein and also to maintain a low acidity wash water so that the resulting casein may be of good solubility. The acidity of the wash water as it flows from the apparatus through pipe 25, usually tests approximately .06% figured as lactic acid. Wash water is removed (preferably continuously) from the adjustable overflow pipe 25. The height of this can be adjusted by the threaded coupling 25a.

As a modification of the process, we have found it to be possible by increasing the amount of precipitating agent, or by further raising the temperature in the curdling step, or both, that the cooked casein can be made to form a homogeneous mass in 15, but instead of rising to the top of the wash water in compartment C, it can be made to settle to the bottom of compartment C and thus can be removed through the large gate valve 26 and flow into shipping container 27. In order to cause the washed, hot plastic casein to settle to the bottom of compartment C instead of rising to the top of compartment C, we find that in general the adjustment of the precipitating acid and temperatures to accomplish this are as follows:

By increasing the ratio of precipitating agent (acid) to the volume of skim milk, so that the acidity of the whey leaving compartment A (curdler-head) through tube 9 is equal to 0.39% to 0.40% or more, (figured as lactic acid). The ratio and control of the precipitating agent is a greater factor in producing a type of casein that will settle to the bottom of compartment C than temperature control, although, at times (in the production of cooked casein that will settle in 15), it may be advisable to raise the curdling temperature (i. e. temperature in A), to a point where the desired results will be accomplished, (e. g. instead of heating to 100–120° F., we would heat to say 135–140° F.).

However, in actual operations of the process, we have found that it appears usually more desirable to follow the procedure wherein the washed casein rises to the top of compartment C and flows out through the spout 18 into the container.

As shown in the drawings, the acid for precipitating the casein from the milk (e. g. sulphuric, etc.) is fed by a pump or gravity from a supply tank, (not shown) through inlet tube 28 into constant level chamber 29, and if the flow of acid is always in excess of the amount required, the excess acid overflows baffle plate 30 into overflow chamber 31 and the excess acid returns by the outlet 32 to the supply vessel, thereby maintaining a constant level (or "head") of the precipitating acid in chamber 29, regardless of the amount being used in the mixing chamber. The precipitating acid entering by flexible tube 33 to nozzle 34, which is (when no milk is in the scale tank 2) at the same level as the acid in chamber 29, remains in an on-flowing state until nozzle 34 is lowered by the action of the weight of milk in chamber 2, which operates the arm 35a, rigidly connected to the movable end of the milk scale tank 2, thereby pulling down the cable 35b, which is wound upon drum 38, causing rotation of the latter and the shaft 38a, upon which this drum is keyed, and causing an elevation of the counter weight 35, carried on the arm 40. The weight of 35, fixed on arm 40 just balances the weight of the empty scale tank 2.

Elevation of the weight 35 actuates the downward movement of nozzle 34, causing precipitating acid to flow out of the nozzle 34, in proportion to the weight of milk in chamber 2. From the nozzle 34 the precipitating acid is fed into a specially designed funnel arrangement 36, which is better illustrated in Figs. 1 and 4, the acid flows from funnel 36 through tube 8 into the mixing chamber 5, in amount directly proportional to the amount of milk entering chamber 5, in the identical time period.

In order to maintain the proper proportion of the precipitating acid, with the varying amount of milk flowing into chamber 2, we have thus developed a special apparatus illustrated in the drawings, the features of which are as follows:

The purpose of chamber 2 and its associated mechanism, which we will refer to in this application as a milk scale, is to maintain a constant ratio of the precipitating acid to the amount of the milk leaving tank 2, regardless of the volume of milk being fed into the apparatus at any particular moment of time. This is of course very important when receiving milk directly from cream separators or fixed holding tanks, in which the milk level is subject to change (hence the pressure and the amount of flow per unit of time) during the period of drawing the milk to the precipitating tank, and such differences cause a variation in the speed of flow. Furthermore, in the event of an interruption in the milk flow while changing separators or for any other reason when the milk is shut off from the curdling apparatus, the addition of precipitating acid will be automatically discontinued. In order to obtain this automatic regulation we have designed a milk flow meter or milk scale, the construction of which is more clearly shown in Figures 2, 3 and 4. This milk scale or milk flow meter consists of a milk chamber 2, which is a long cylindrical tube supported at a point near its inlet end upon a fulcrum 37, suspended in a floating position and counter-balanced by weight 35 and operating through a drum 38, by the cable 35b, the apparatus being mounted on stationary bearing 39 carried on a post 39a. To further assist the proper adjustment of the ratio of precipitating acid to the milk, a weight 35 has been provided with facilities to vary its position on arm 40. On the shaft 38a, operating drum 38, there is rigidly mounted a counter-balance arm 41 and upon arm 41 there is a sliding weight 42 for the purpose of adjustment or balancing of same and operated by the adjustment screw 43, having a left hand thread and on the other end of the counter-balance arm 41, there is a nozzle pouring spout 34 carried on block 34a, and operated by rod 44. This screw 43 has a right hand thread and the screw 43—44 is adjusted by the hand wheel 45. At each end of the bar 41 there is provided a bearing standard 41a, for the end portions of the screw 43—44. This screw is prevented from longitudinal movement in its bearings by collars 41b, fixed thereon.

As shown in Fig. 3, the tank 29 may be adjusted vertically, by the screw 29a, on stationary bracket 29b, to bring the acid level in said tank to exactly the level of the outflow nozzle 34, with scale tank 2 empty.

By properly adjusting the weights above referred to, we have found that we are able to maintain a fixed ratio between milk and precipitating acid to a very accurate degree and sufficiently accurate to cause no difficulty in operating our curdling apparatus without continuous and costly adjustments and excess requirement of time of a skilled operator to continually observe the flow of precipitating acid and milk in order to secure uniform results.

Due to the varying acidity of milk as received at a creamery or at the receiving tank of the curdler, we have found it is desirable to make preliminary adjustments when starting the curdling operation with our curdling mechanism on each particular batch of milk. We therefore prefer to proceed as follows:

1. After the milk has been flowing for a few minutes through the curdler-head and the whey has reached the overflow point represented by top of tube 9, an acidity test is taken of the whey coming through 9. The method of determining this acidity test may be the method commonly employed in creameries, cheese factories and milk plants, for this purpose. As a usual thing for this work, an acidimeter which gives a direct reading of acidity (figured as lactic acid) is used, for instance a Nafis apparatus well known in the art, or if desired, the operator may titrate by the usual laboratory method using 10/N sodium hydroxide solution with phenolphthalein as an indicator. We have found that for most satisfactory operations with the average type of skim milk coming from the separator, that this acidity test (on the whey leaving 9) should show an acidity equal to about 0.35% of lactic acid. The proportion of mineral acid added to precipitate the casein is then adjusted, if need be, to give this degree of acidity.

2. If the acidity by following the above mentioned procedure, is found to be too great, a slight adjustment of the hand wheel 45, is made to reduce the amount of precipitant flowing into the milk, or if it is found by the acidity test as referred to above that the amount of precipitating acid is too small, this is increased by adjustment of the hand wheel 45 to the point where a little more of the precipitating acid enters the milk, and in any case another acidity test is made after a few minutes, taking the whey at the point of overflow tube 9. After a short time the desired acidity of the whey is reached and thereafter it is generally not necessary to make any further adjustments as to the amount of precipitating acid entering the milk during a day's operation, providing the acidity of the incoming milk does not change. Should there be a change in acidity of the incoming milk it will be necessary to adjust somewhat the amount of precipitating acid.

By referring to the drawings it will be noted that with a flow of milk through chamber 2, the arm 41 will be in an inclined position. This raises or lowers nozzle 34 by adjustment of wheel 45.

Since the left hand screw 43 also changes the position of the counter-weight 42, to correspond with any change in the position of nozzle 34, a constant balance is maintained. If a change in volume or weight of milk through chamber 2, occurs and at the new setting of winding drum 38, the ratio of the precipitating acid to milk changes, it may be corrected by adjusting weight 35 on arm 40. No further adjustment is necessary to weight 35 thereafter, as the ratio of precipitating acid to the milk will remain constant at any other volume or weight of milk flowing in chamber 2.

In order to be assured that the injection of steam from nozzle 7, does not permit any of the precipitated casein to reenter the mixing chamber 5, which is not desired, we have designed an adjustable gate 46 operated by rod and handle 47, which is so adjusted as to prevent any of the precipitated casein from reentering the mixing chamber 5 and without in any way interfering with the proper mixing and curdling action within chamber 5.

In the foregoing description throughout this application we have referred, in describing this process, to "precipitating acid." For the purpose of this patent application we wish it to be understood that when we refer to "precipitating acid" we mean any acid or combination of acids, or whey which has been kept for a sufficient length of time to develop sufficient acidity for the precipitation of milk and it is further, of course, understood, that we claim such precipitating acids when used at any desired strength or dilution.

We do not wish to be limited to the exact figures referred to in this specification so far as temperatures, amount of wash water, acidity, etc., as it is to be understood that more or less modifications of these figures may be used, depending upon the type of milk employed, without departing from the scope of this invention.

It is to be understood that in place of the drum 38 (which may be round or oval in cross section) a cam mechanism or equivalent means for maintaining a constant ratio between the milk and precipitating agent, may be substituted.

Apparatus as shown and described herein is claimed in our copending application, Ser. No. 347,510, filed July 25, 1940.

We claim:

1. In the preparation of cooked acid-precipitated casein, the herein described process which comprises continuously flowing milk through a precipitating chamber and continuously adding acid thereto in amount sufficient to precipitate casein in said milk, while heating the milk to at least about 100 to 120° F., the amount of said acid being so proportioned throughout said treatment to the amount of said milk, as to give a substantially uniform acidity, at which the casein is precipitated in a flocculent state, and the proportion of acid to milk being maintained by the rate of inflow of the milk, irrespective of fluctuations in said rate of inflow, continuously separating the acid-precipitated casein from the whey, and adding this casein to water in amount sufficient to wash out free acid carried by the casein, and continuously cooking said casein in said added water, whereby cooked casein of substantially uniform quality is produced continuously.

2. A process as in claim 1, in which the amount of acid added to the milk is sufficient to precipitate the casein and leave a whey having an acidity equivalent to about 0.35% of lactic acid, and the heating in the precipitation step is carried to about 100–120° F., whereby the cooked casein floats on the wash water.

3. A process as in claim 1, in which the amount of acid added to the milk is sufficient to give a precipitate of casein and a whey having an acidity equivalent to at least about 0.39% of lactic acid, and the heating in the precipitation step is carried to about 120–140° F., whereby the cooked casein sinks in the wash water.

4. In washing casein curd from which the bulk of the whey has been removed, the step of dropping the casein curd in its initially wet state, as separated from the whey, into a stream of water at 150 to 180° F., said stream of water flowing with sufficient force to break up the casein and to thereby wash the same, and continuing the heat treatment sufficiently long to form "cooked casein."

5. In washing casein curd, the herein described steps which comprise continuously breaking up the casein curd by dropping the same, after separation from the bulk of the whey, into a strong jet of water at about 150 to 180° F., and spraying cold water upon the casein mass while carried in said water, to break up foam formed, and continuing the action of said heated water sufficiently to cook the washed casein curd.

6. In the preparation of cooked acid-precipitated casein, the herein described process which comprises continuously flowing milk through a precipitating chamber and continuously adding acid thereto in amount sufficient to precipitate casein in said milk, while heating the milk to at least about 100 to 120° F., the proportion of added acid to milk being maintained uniform during the continuance of said precipitation step, by the weight of the milk entering such precipitation step, and the said proportion being kept uniform during the continuance of said step, regardless of variations in the rate of milk supply, and maintaining a degree of acidity in the mixture of milk and acid at which the casein is precipitated in a flocculent state, continuously separating the acid-precipitated casein from the whey, and adding this casein to water in amount sufficient to take up free acid carried by the casein, and continuously cooking said casein in said added water, whereby cooked casein is produced continuously.

7. In the precipitation of casein from milk, the herein described improvement which comprises flowing the milk into the precipitation step, and varying the amount of acid added to the milk by the weight of the inflowing milk at each particular time interval, to maintain a uniform ratio of acid to milk, in spite of any variation in the rate of supply of said milk.

8. In the preparation of cooked acid-precipitated casein, the herein described process which comprises continuously flowing skim milk into and through a precipitating chamber and continuously adding acid thereto in amount sufficient to precipitate the casein in said milk in a floating condition, while heating the milk to at least about 100° to 120° F., the ratio of the acid to the milk being maintained substantially uniform so long as the acidity of the inflowing milk is uniform and readjusting the ratio of acid to milk whenever the acidity of the inflowing milk becomes substantially altered, and the amount of such acid added to said milk being sufficient to cause the casein to be precipitated in a soft, flocculent floating condition, and continuously separating the floating acid-precipitated casein from the whey, and subjecting the so-separated casein to the disintegrating action and washing action of a forceful stream of heated water, in amount sufficient to wash out free acid carried by the casein, and continuously cooking said casein while in said added water and while in part at least floating upon said water, whereby cooked casein of substantially uniform quality is produced continuously.

VERNON J. LOWE.
ARTHUR W. BEAN.